July 18, 1967
C. A. HAGBERG
3,331,433
TRUCK DUMP BOX WITH HEATING MEANS
Filed Dec. 23, 1964
2 Sheets-Sheet 1
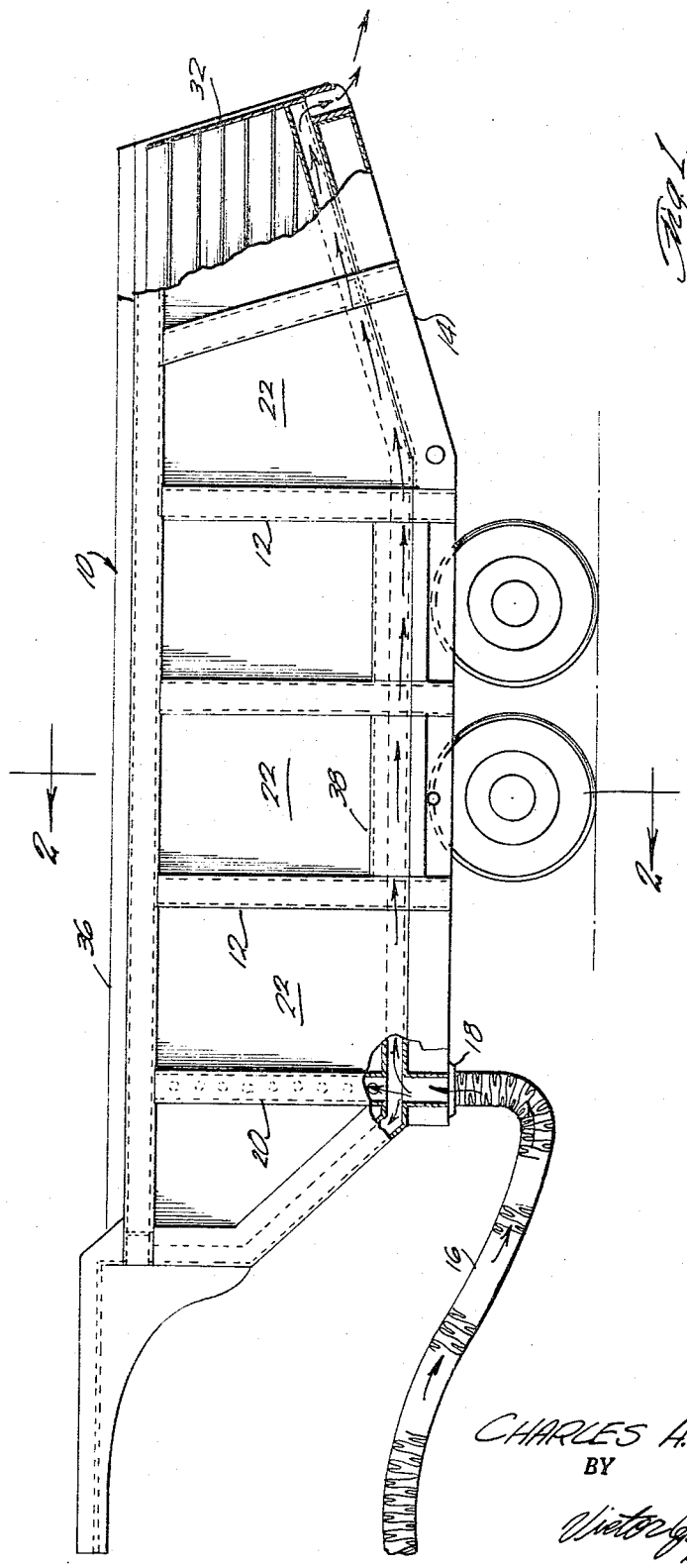
INVENTOR.
CHARLES A. HAGBERG
BY
Victor J. Evans & Co.
Attorneys

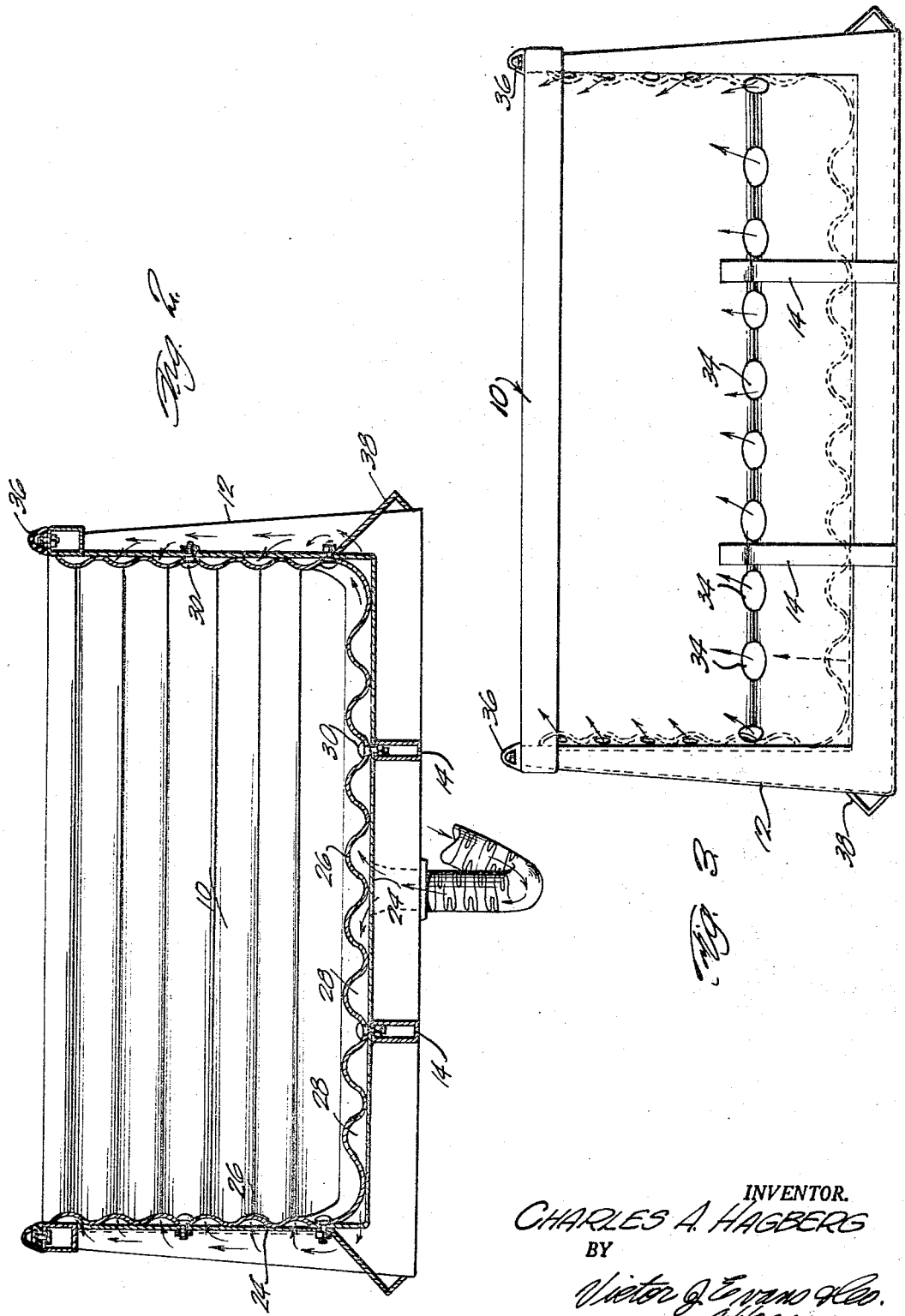

United States Patent Office 3,331,433
Patented July 18, 1967

3,331,433
TRUCK DUMP BOX WITH HEATING MEANS
Charles A. Hagberg, Duluth, Minn., assignor to Zalk-Josephs Company, Duluth, Minn., a corporation of Minnesota
Filed Dec. 23, 1964, Ser. No. 420,492
1 Claim. (Cl. 165—51)

ABSTRACT OF THE DISCLOSURE

A heated dump truck box in which the heating plate is secured within the walls of the box and the walls comprise a plurality of curved, substantially large corrugated wall sections running fore and aft of the box, a conduit connected to the exhaust of an internal combustion engine, a plurality of exhaust ports from the rear of the heating plate chamber and the front frame member being in heat conducting communiaction with one end of the heat chamber and the back frame member being in heat conduction communication with another end of the chamber and with the atmosphere through said plurality of exhaust ports.

---

This invention relates generally to a dump truck box and more particularly to a novel configuration for a dump truck box which absorbs shock and eliminates the creation of frozen material therein.

Materials to be hauled in the iron mining industry are of varied consistency from large pieces of rock, like iron ore, to very fine sized dust. This ore may vary from a very dry condition to an extremely wet condition. Since open pit mining is carried on year around, the temperatures may extend to as low as 30 degrees below zero.

Several problems exist because of the two above mentioned conditions of the varied consistency of the material and the variance in operating temperatures. When large pieces of ore are dropped from a shovel dipper into a dump truck box, a tremendous impact is imparted thereto. This impact on trucks, presently employed is transmitted through a one inch thick, flat steel bottom directly to the chassis and springs of the truck, causing fatigue and short truck life. When operating in below zero weather which causes ordinary steel to become brittle, this problem becomes even more critical. Steel parts, including the thick bottoms, often crack and break.

When wet material is handled on the dump truck box in cold weather, it is easily and quickly frozen together and to the sides of the box. Such freezing problems, of course, are detrimental to the efficient operation of a hauler, since a considerable amount of time and work are expended in removing the frozen materials from the truck box.

However, the heating of the bottom of truck boxes for preventing the formation of frozen materials therein is not new and is widely used. The existing truck boxes which employ means connected with the exhaust system of a truck for eliminating such problems, however, cause approximately two inches of mercury back pressure on the truck manifold which reduces the efficiency of the truck's motor.

It is a primary object of this invention, therefore, to provide a truck bed with structures for absorbing shock. It is another primary object of this invention to provide a truck bed with structures for reducing or eliminating the problem of freezing materials therein.

It is another object of this invention to provide a truck box with structures for conducting exhaust gases thereto which will substantially eliminate back pressure on the truck exhaust manifold.

These and other objects will be more fully realized from the structure of the present invention which includes a bottom portion of the truck box having a plurality of curved sections extending the length of the box. Exhaust gases are received from holes in the bottom of the box, and forced through the curved sections to provide heating thereof. The curved sections are also formed to provide a shock absorbing effect to objects dropped.

The invention however will be more fully realized and understood from the following detailed description when taken in conjunction with the accompanying drawings therein:

FIGURE 1 is a side view of a truck bed employing the invention and showing a connection thereto with the exhaust system of a truck;

FIGURE 2 is a sectional view taken along line 2—2 of FIGURE 1 and illustrating the shape and structure of the invention; and FIGURE 3 is a front view of the invention with the front panel removed to show the structure of the invention in phantom lines and illustrating the means for allowing passage of exhaust gases therethrough to the atmosphere.

Like reference numerals throughout the various views of the drawings designate the same or similar structures.

As illustrated in FIGURE 1, a truck dump box 10 includes a plurality of side frame members 12 and bottom members 14. A conduit 16 is connected between the truck exhaust manifold (not shown) and intake port 18 on a front frame member 20. Side and bottom walls 22 supported by the frame members, constitute the opened box as shown.

Walls 22 include a heating plate 24 and a corrugated wall structure 26. The corrugated wall includes a plurality of continuous curved sections and forms with the heating plate 24 a plurality of heating chambers 28. The corrugated wall is preferably a high strength metal to withstand and absorb shock from heavy objects striking thereagainst.

The front frame member includes a plurality of holes therein for distributing exhaust gases to the heating chambers 28. Plate 24 and walls 26 are secured to the frame members by means of bolts 30.

A back frame member 32 includes a plurality of exhaust ports 34 for conducting exhaust to the atmosphere. The exhaust gases which are distributed into the heating chambers 28 formed in the side and bottom walls pass within the corrugated structures to heat the interior of the truck box. The exhaust gases entering intake port 18 and passing through the curved sections, are released to the atmosphere through exhaust ports 34 in a back frame member 32.

A rubber fender 36 is provided along the top portion of the box for added protection thereto and wheel guards 38 are provided along the sides thereof. It can be seen that heavy objects falling into the box will be cushioned by the sides and bottom, the curved section absorbing the impact by deflection and sideward movement thereof. By this structure, the entire inside surface of the dump truck box performs as a spring. The use of high strength material for the corrugated sections will provide absorption of any impact on a continual basis with no fatigue failure resulting in the frame members and springs of the truck.

The structure illustrated in FIGURE 3 shows exhaust ports 34 at the rear of the truck box for allowing exhaust gases to escape to the atmosphere. Since the cross sectional area of the curved sections and the exhaust ports can be considerably larger than the exhaust conduit of the truck, none or very little back pressure will be created on the exhaust manifold.

Although various metals and strengths thereof may be employed, super strength steel in the 100,000 p.s.i. range, such as, construction grade T1 (by U.S. Steel) will absorb heavy impact on a continual basis with no fatigue failure.

The principles of the invention explained in connection with the specific exemplification thereof will suggest many other applications and modifications of the same. It is accordingly desired that, in construing the breadth of the appended claim they shall not be limited to the specific details shown and described in connection with the exemplification thereof.

What is claimed is:

A dump truck box comprising side and bottom frame members, a heating plate secured between said frame members to form an opened box, a plurality of curved, substantially large corrugated wall sections secured to the inner surface of said heating plate along said bottom member and extending also along said side members and providing therewith a plurality of heating chambers throughout the length of the side and bottom frame of the truck box, a conduit to connect heated gases to said heating plate by an intake port, a front frame member having said intake port disposed for connection by said conduit to the exhaust of a truck, said front frame member being connected with said heating chambers, and a back frame member connected to said heating chambers and including a plurality of exhaust ports therein, said front frame member being connected at one end of said heating chambers and said other member being connected to the other end of said chambers, and said front frame member being in heat-conducting communication with one end of said chambers and said back frame member being in heat-conducting communication with the other end of said chambers and with the atmosphere through said plurality of exhaust ports.

References Cited
UNITED STATES PATENTS

| | | | |
|---|---|---|---|
| 2,721,097 | 10/1955 | Rittenhouse | 296—28.22 X |
| 2,925,301 | 2/1960 | Milligan | 296—28.22 |
| 2,974,997 | 3/1961 | Parsley et al. | 298—374 |

ROBERT A. O'LEARY, *Primary Examiner.*

CHARLES SUKALO, *Examiner.*